INVENTOR.
A. H. JESSEN
Fred H Hayn
ATTORNEY.

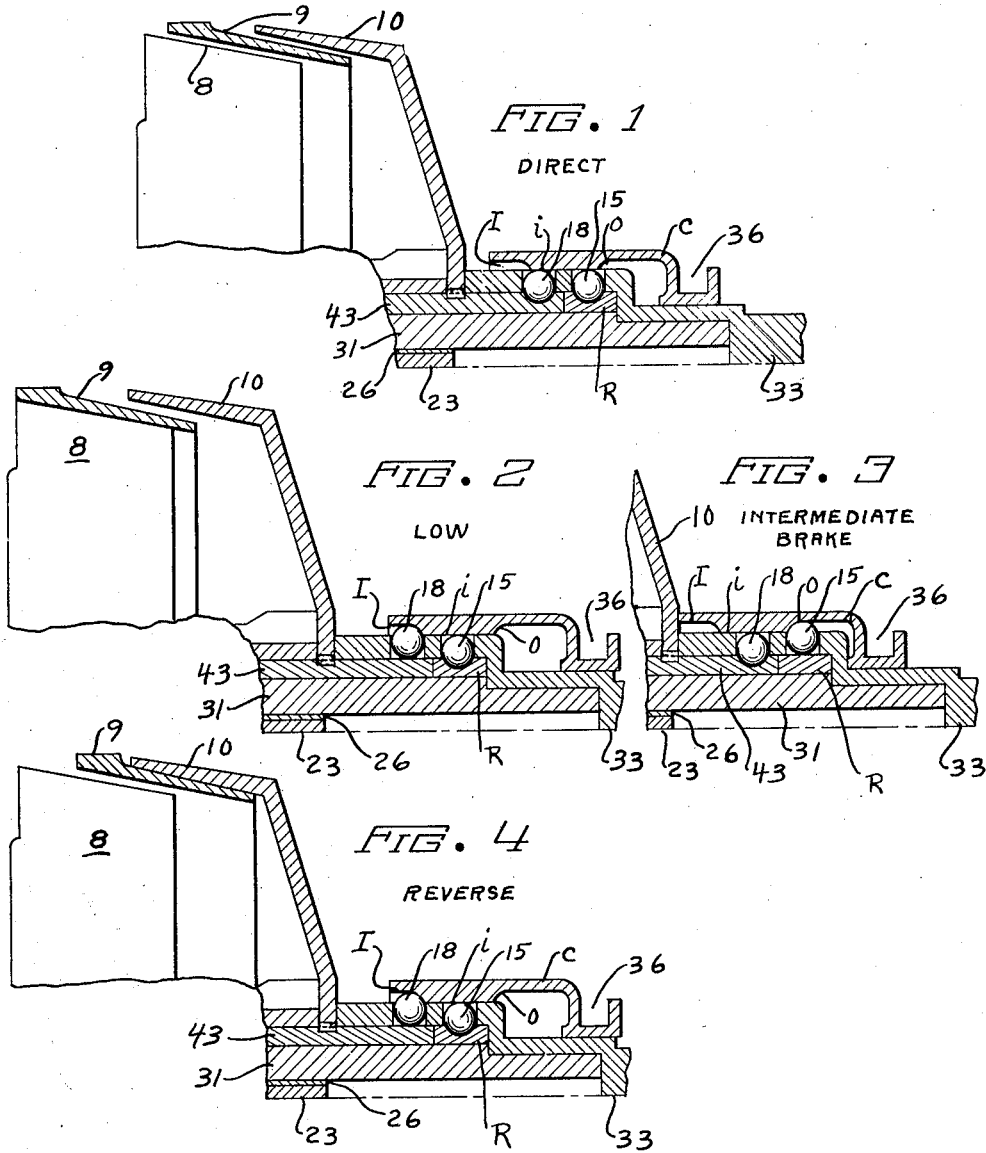

Patented Apr. 2, 1929.

1,707,399

UNITED STATES PATENT OFFICE.

ARNOLD H. JESSEN, OF LOS ANGELES, CALIFORNIA.

TRANSMISSION.

Application filed April 8, 1926. Serial No. 100,550.

My invention relates to transmission mechanisms especially adapted for use in connection with motor vehicles, although in its broader aspects is adapted for general use wherever it is desired to provide for speed changes, a reverse movement, brake application, or an idling movement.

It accordingly is an object of my invention to provide a novel form of transmission mechanism in which a set of clutch elements in the shape of conical drums, preferably overlapping, are provided, one of which being adapted selectively to be brought into engagement with the two others so that they may be held stationary or revolve, by means of a sliding clutch, preferably of the ball type associated with a set of concentric tubular shafts adapted selectively to be locked to a drive shaft, which tubular shafts each have associated therewith a sun gear in mesh with two planet pinions associated with one of said clutch elements, which clutch element functions as a planet carrier, a third planet pinion in said planet carrier meshing with a drive pinion on a drive shaft adapted to be clutched to a source of power, said mechanism functioning to cause said drive shaft to drive said driven shaft at different speeds, and also to reverse the movement of said driven shaft, brake application being made by bringing the intermediate clutch element in contact with one of said drums, the neutral or idling movement of the mechanism, however, being accomplished by an additional clutch device, preferably associated with the flywheel of the motor or source of power.

The above and further objects and advantages as will hereinafter more fully appear I obtain by the mechanism constructed in accordance with the specification and illustrated on the drawings accompanying the same, and forming a part of my application.

Figure 5:
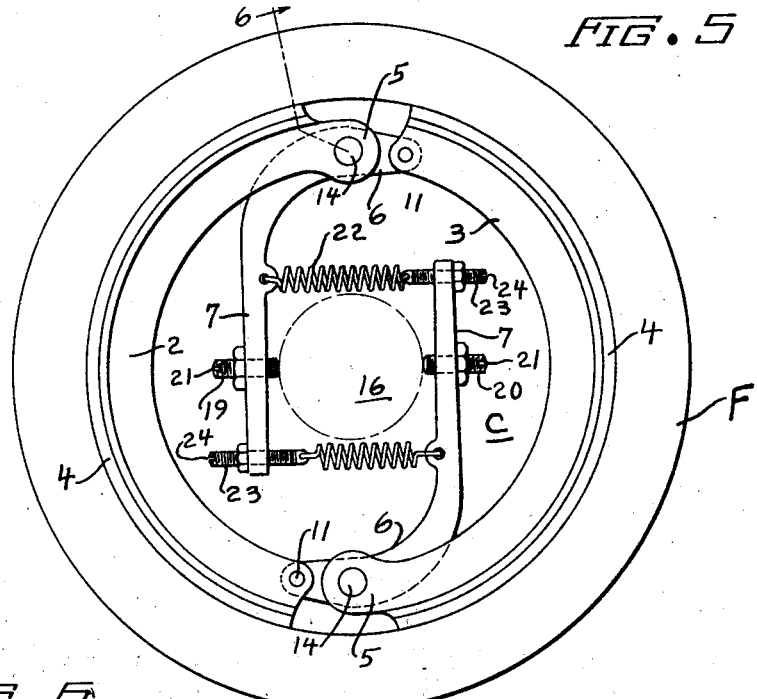
Figure 6:
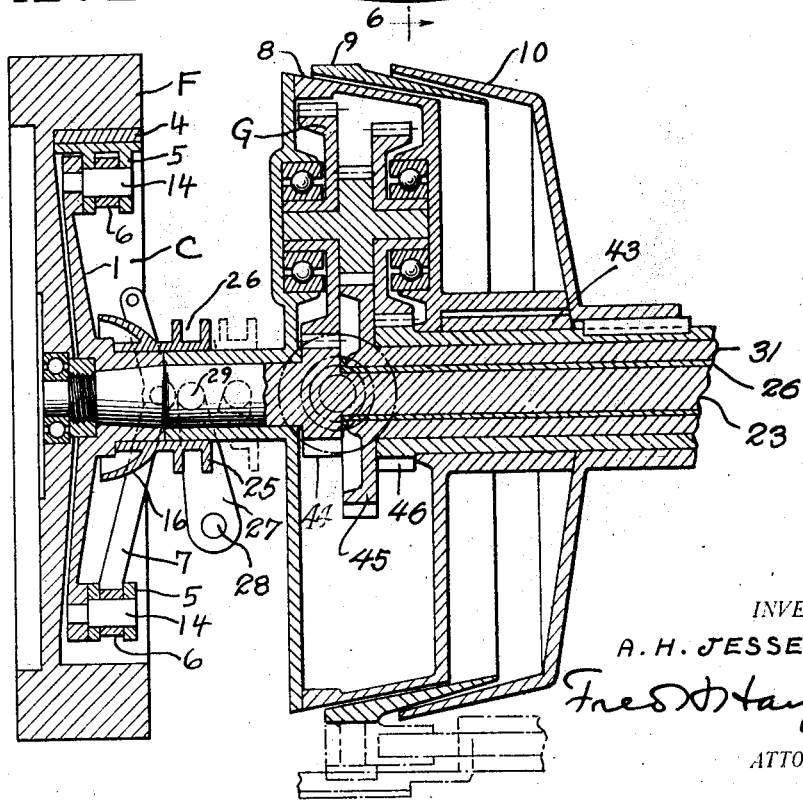

Reference is had to the accompanying drawings, in which similar reference characters denote similar parts. In the drawings, Fig. 1 is a fragmentary cross-sectional view of the conical clutch elements, associated with my transmission mechanism, and the slidable ball clutch, the parts being in position for a direct drive, Fig. 2 is a similar view of the parts connected for low speed, Fig. 3 is a similar view illustrating the manner in which the parts are coupled for intermediate speed, Fig. 4 is a similar view depicting the various parts in position for reverse movement, Figs. 1 and 3 also showing the parts in their position when brake application is made, Fig. 5 is a front elevational view of the clutch associated with the fly wheel to provide for a neutral or idling position of the mechanism, and Fig. 6 is a cross-sectional view on the line 6—6, Fig. 5, showing also in fragmentary form the conical clutch elements and the planet carrier associated therewith.

Describing my invention more in detail, the mechanism disclosed herein is an improvement on my pending application for a transmission mechanism, Serial #69,140, filed Nov. 14, 1925.

It has been found in practice that by providing the fly wheel of the motor with a clutch of special construction, operating, so far as I am aware, in directly the opposite direction to known clutches, the structure disclosed in the application above referred to can be more inexpensively manufactured, certain parts of said structure being omitted by providing for an idling movement solely by disengaging said clutch from the fly wheel with which it is associated. This improved construction also provides for a simpler and smoother action, without any objectionable noise or movement when the parts are shifted, said shifting being accomplished in a simple manner, and without any danger to the parts, such as stripping of the gears, the mechanism being absolutely "foolproof".

As disclosed in the pending application above referred to, a set of overlapping conical clutch elements or members 8, 9 and 10 are provided, the conical members 8 and 10 being intermittently rotatable and stationary, the intermediate conical member or planet carrier 9 being adapted intermittently to be brought into engagement with either conical member 8 or 10, as shown more particularly in Figs. 1 to 4 inclusive. It will be understood, of course, that complete conical members are provided, the structure being duplicated on the lower side of the center line of said figures.

As seen in Figs. 1 to 4 inclusive and 6, drive and driven shafts 23 and 33 are provided, which shafts are intermittently brought into engagement by means of three planet pinions G, housed in the carrier 9 of conventional form, to effect the speed changes desired, said pinions having a planetary movement only when a reverse movement of the shafts is desired, thus differing materially from the transmission constructions now on the market. The drive shaft 23 is equipped with a drive pinion 44 meshing with one of said planet pinions G, while the other of said pinions are in mesh with the sun gears 45 and 46 on the tubular shafts 31 and 43, presently to be more particularly referred to.

As depicted in Figs. 1 to 4 inclusive, a set of balls 15 and 18 are provided, said balls being adapted to be positioned in or removed from cavities or depressions formed within the shaft 43 and a ball depression ring R, keyed or otherwise associated with the tubular low speed shaft 31. As hereinafter more particularly described, for a direct drive, the parts are positioned as shown in Fig. 1.

Surrounding the tubular shaft 33 is a slidable or reciprocating clutch c, equipped with a groove 36, adapted to be engaged by a clutch fork or arm, not shown, which fork or arm may be operated by means of any desired form of gear shifting mechanism, either of conventional or special construction. The clutch c is equipped with a cam projection i, and a pair of cam cut-away portions I and o for engaging with the balls 18 and 15.

For a direct drive, the parts are positioned as shown in Fig. 1, the shaft 43 and ball depression ring R, which is keyed or otherwise associated with the gear shaft 31, being locked to the driven shaft 33 by the balls 18 and 15, the slidable or reciprocating clutch c depressing said balls in the sockets or cavities, the intermediate conical member or clutch element 9 being disengaged from the conical members 8 and 10, the cam projection i holding said balls locked as shown. The clutch C is in engagement with the fly wheel F.

The position of the parts for a low speed drive is shown in Fig. 2, the cam I permitting the disengagement of the balls 18, the cam i locking the balls 15 in the ball depression rings R, keyed or otherwise associated with the tubular low gear shaft 31, the clutch c having been moved to the position shown, the concial member 9 being in locked engagement with the planet carrier 8, as shown in said figure. The clutch C is also in engagement with the fly wheel F.

The intermediate drive position is shown in Fig. 3, the balls 18 being locked to the shaft 43, rotating the intermediate gears, the clutch c having been moved to the position indicated, and the conical clutch 9 being in locked engagement with the planet carrier 8. A brake application may be made also with the parts in the position shown in this figure, the conical members 9 and 10 being brought into engagement for this purpose. A brake application may also be made by a reverse movement of the mechanism, which reverse movement may be made when the parts are positioned as depicted in Fig. 4. The clutch c in this instance is also in engagement with the fly wheel F.

As just stated, both a reverse movement of the mechanism and a brake application may be made when the parts are positioned as depicted in Fig. 4. In this case the cam i is in engagement with the balls 15, locking the depression ring R and the shaft 31, the conical members 9 and 10 being in engagement, and the planet pinions and sun gears having a planetary action, as previously described, and this is the only time they have such action. Any suitable mechanism may be provided for shifting the conical member 9 and the clutch c. There is no provision made in the structure thus far described for a neutral position. The construction for providing for a neutral or idling movement will now be described.

As seen in Figs. 5 and 6, the fly wheel F is equipped with a clutch C of preferably cylindrical form, and provided with a conical member 1, to which are fulcrumed the arcuate members 2 and 3, which are desirably provided with brake bands 4 of any preferred type, which bands are adapted intermittently to be brought into frictional engagement with the inner surface of the fly wheel F, or disengaged therefrom.

Each arcuate member 2 and 3 is equipped with an enlarged portion 5 of bifurcated form, between which are positioned the upper ends 6 of the parallel clutch arms 7, pivoted at 11 to the other arm, as shown more particularly in Fig. 5, pins or other devices 14 being provided to secure the parts firmly together, the pins 14 being stationary, but the pivots 11 being movable toward and away from the inner surface of the fly wheel.

The clutch arms 7 are parallel and moved in parallel relation by means of a conical cone or other member 16, an adjusting means 19 and 20 being used to adjust said arms toward and away from said cam, said means taking the form of a nut and bolt construction, preferably equipped with a kerf 21 adapted to be engaged by a screw driver. It will be of course understood that any other adjusting means may be provided. To retard the movement of the arms 7, and hold them in parallel relation, a pair of helical or other springs 22 are provided, anchored to said arms as shown, and on the opposite ends are anchored to adjustable screw-threaded bolts 23, similar to the bolts 19 and 20, and also each equipped with a kerf 24 to be engaged by a screw driver. It will be understood also that this construction is suggestive merely, and in practice may be altered as desired.

Associated with the clutch cam 16 in any manner desired, is a collar 25, grooved as at 26, to be engaged by a fork or other operating means of any sort, whereby the movement of the clutch C may be transmitted to the clutches of the transmission mechanism, which mechanism may of course be that herein disclosed, or of any conventional or known type. The clutch C may also be connected to any form of gear shifting apparatus by means of the lever 27, pivoted at 28 to any part of the apparatus, which lever is equipped with an anti-friction roller 29.

The operation of the clutch C should now be clear. The clutch is shown engaged in Fig. 5. Moving the fork or other operating member outwardly, the clutch cam 16 spreads apart the arms 7, which turn on the fulcrums 14, pulling the pivots 11 inwardly, and the arcuate members 2 and 3 away from the fly wheel. An inward movement of the clutch cam 16 permits the arcuate members to engage with the fly wheel.

The purpose, then, of the clutch C is to disengage the transmission from the motor or source of power. When so disengaged the motor runs idle. When said clutch is engaged with the fly wheel, the various speeds, brake application and reverse movement may be had. When the member 9 is in neutral position, that is, when not engaged with the drums 8 or 10, the motor and transmission runs idle. The drums 9 being brought into engagement with the drum or planet carrier 8, the clutch C being engaged, the driven shaft 33 may be operated as explained.

While I have thus described my invention with great particularity, it will be clear that the same may be modified throughout a wide range. I accordingly do not propose to be limited to the exact details of construction shown and described, but reserve the right in practice to make any and all modifications thereof that fall within the scope of the appended claims.

I claim as my invention:

1. A driving shaft, a driven shaft having a sleeve provided with ball apertures, a set of members concentric with said sleeve and having depressions adapted to receive said balls, one of said members being in alignment with another of said members and keyed to the third of said members, means to drive two of said members from the driving shaft at different speeds, and cam means for forcing the balls into the depressions in either of said two members.

2. A driving shaft, a driven shaft having a sleeve provided with ball apertures, two members concentric with said sleeve and having depressions adapted to receive said balls, a ball depression ring in alignment with one of said members and keyed to and surrounding the other of said members, said ring being also adapted to receive said balls, means to drive the two members from the driving shaft at different speeds, and cam means for forcing the balls into the depressions in either of said two members.

3. In a transmission mechanism, a driving shaft having a fly wheel thereon, clutching means on said shaft for clutching the latter to said fly wheel, a pinion on said shaft, a conical drum planet carrier having three interconnected planet pinions, one of which meshes with the pinion on the driving shaft, two sun gears meshing with the other of said planet pinions, a conical drum overlapping said planet carrier for controlling the rotation of said planet carrier, a driven shaft, and clutch means for connecting either or both of the sun gears to the driven shaft.

In testimony whereof I have signed my name to this specification.

ARNOLD H. JESSEN.